(12) United States Patent
    Jensen

(10) Patent No.: US 10,255,219 B2
(45) Date of Patent: Apr. 9, 2019

(54) USB ENABLED BASE STATION FOR A HEADSET

(71) Applicant: GN AUDIO A/S, Ballerup (DK)

(72) Inventor: René Elbæk Jensen, Ballerup (DK)

(73) Assignee: GN AUDIO A/S (DK)

( * ) Notice: Subject to any disclaimer, the term of this patent is extended or adjusted under 35 U.S.C. 154(b) by 0 days.

(21) Appl. No.: 15/661,814

(22) Filed: Jul. 27, 2017

(65) Prior Publication Data

US 2018/0046429 A1 Feb. 15, 2018

(30) Foreign Application Priority Data

Aug. 11, 2016 (EP) ..................................... 16183662

(51) Int. Cl.
  *G06F 3/16* (2006.01)
  *G06F 5/14* (2006.01)
  (Continued)

(52) U.S. Cl.
  CPC ............ *G06F 13/4031* (2013.01); *G06F 3/16* (2013.01); *G06F 3/162* (2013.01); *G06F 5/14* (2013.01);
  (Continued)

(58) Field of Classification Search
  CPC ........ G06F 13/10; G06F 13/12; G06F 13/122; G06F 13/14; G06F 13/1673; G06F 13/20;
  (Continued)

(56) References Cited

U.S. PATENT DOCUMENTS

2002/0097220 A1* 7/2002 Ferguson .............. G06F 13/409
  345/156
2007/0245057 A1 10/2007 Bohn et al.
  (Continued)

FOREIGN PATENT DOCUMENTS

EP 2276025 1/2011

*Primary Examiner* — Thomas J Cleary
(74) *Attorney, Agent, or Firm* — Altera Law Group, LLC

(57) ABSTRACT

An apparatus (301) for communication according to a Universal Serial Bus, USB, specification, comprising: a first USB device (301) and a second USB device (306) for connecting operatively to a first USB host and a second USB host, respectively; an audio interface stage (320) configured to interface with an audio component such as a headset; and audio controller (316).
The audio controller (316) is configured with: a first channel (327), channeling audio signals between the first USB device and the audio interface stage (320), and a second channel (328), channeling audio signals between the second USB device and the audio interface stage (320); wherein the audio controller (316) automatically switches between the first channel (327) and the second channel (328) while giving priority to audio signals on the first channel over audio signals on the second channel.
Thereby respective software programs, among which one requires priority access to the audio component, running on one hardware apparatus, such as a personal computer, or on separate hardware apparatuses can be operatively connected to respective USB devices while sharing one audio component and while giving one of the respective software programs priority access to the audio component.

15 Claims, 4 Drawing Sheets

(51) Int. Cl.
*G06F 13/16* (2006.01)
*G06F 13/38* (2006.01)
*G06F 13/40* (2006.01)
*G06F 13/42* (2006.01)
*H04R 1/10* (2006.01)

(52) U.S. Cl.
CPC ........ *G06F 13/1673* (2013.01); *G06F 13/385* (2013.01); *G06F 13/4022* (2013.01); *G06F 13/426* (2013.01); *G06F 13/4282* (2013.01); *G06F 2213/0042* (2013.01); *H04R 1/1041* (2013.01); *H04R 2420/09* (2013.01)

(58) Field of Classification Search
CPC ........ G06F 13/22; G06F 13/225; G06F 13/24; G06F 13/26; G06F 13/30; G06F 13/32; G06F 13/34; G06F 13/36; G06F 13/368; G06F 13/37; G06F 13/385; G06F 13/40; G06F 13/13; G06F 13/4004; G06F 13/4022; G06F 13/4027; G06F 13/4031; G06F 13/4265; G06F 13/4282; G06F 3/16; G06F 3/162; G06F 3/165; G06F 5/14; G06F 13/426; H04R 1/10; H04R 1/1041

See application file for complete search history.

(56) References Cited

U.S. PATENT DOCUMENTS

| | | | |
|---|---|---|---|
| 2007/0245058 A1* | 10/2007 | Wurzburg | G06F 13/4022 710/313 |
| 2010/0158288 A1* | 6/2010 | Winter | H04R 5/04 381/311 |
| 2014/0068317 A1* | 3/2014 | Kanigicherla | G06F 9/5011 714/2 |
| 2014/0181338 A1* | 6/2014 | Loh | G06F 3/165 710/63 |
| 2015/0234763 A1* | 8/2015 | Kline | G06F 13/4022 710/313 |
| 2015/0356045 A1* | 12/2015 | Soffer | G06F 13/4221 710/303 |
| 2018/0101496 A1* | 4/2018 | Chang | G06F 3/038 |
| 2018/0143932 A1* | 5/2018 | Lawless | G06F 13/4282 |

\* cited by examiner

USB ENABLED BASE STATION FOR A HEADSET

Universal Serial Bus (USB) specifications specifies standardised ways of communicating digital signals between a USB host and one or more USB devices. Typically a personal computer has a USB host that via a USB hub connects to one or more USB devices. Each USB device connects to one USB host. USB is a widespread standard and almost all types of consumer electronics products have an USB port.

USB devices are registered (enumerated) at the USB host when connected physically thereto and should be registered with a particular class e.g. as an audio class product. Audio class products comprise e.g. headsets for telephones, loudspeakers, and microphones.

On general purpose computers software programs are configured to interface programmatically with a connected USB device. One USB device may serve several software programs e.g. a softphone (a software program functioning as a telephone) and a music player or two different softphones. In such situations however, giving and maintaining priority to one such software program for it to have a priority use of a particular USB device may often fail. One reason may be that one software program may interfere with the USB device despite another software program is using the USB device. A user may have a preference to use one USB device, say a headset, for several software programs, but may find it very disturbing that an ongoing call via one softphone is disturbed by another call via another softphone, which ignores that a call is already ongoing.

RELATED PRIOR ART

U.S. Pat. No. 8,363,844 describes contextual audio switching for a USB controlled audio device coupled to a processor-based host. A single physical USB connection connects the processor-based host (such as a PC) with a USB device (such as a 'dongle') and multiple virtual connections are then established on that physical USB connection to respective USB audio endpoints at the USB device from respective audio applications running on the processor-based host. At the USB device two or more such USB audio endpoints are monitored to identify an audio signal presence and (one) priority audio signal is then determined responsive to identifying the audio signal presence at two or more USB audio endpoints. In this way the priority audio signal is coupled to the audio transducer (connected to or integrated with the USB device).

However, it has been discovered that the contextual audio switching described above fails to be compatible with at least some major software applications maybe because these software applications do not allow being assigned to an endpoint on a USB device that is used by another software application.

SUMMARY

There is provided an apparatus for communication according to a Universal Serial Bus, USB, specification, comprising:
 a first USB device for connecting operatively to a first USB host via a first USB device port; wherein the first USB device has a first audio function unit with a first audio terminal;
 an audio interface stage configured to interface with an audio component;
 a second USB device for connecting operatively to a second USB host via a second USB device port; wherein the second USB device has a second audio function unit with a second audio terminal; and
 an audio controller configured with: a first channel, channeling audio signals between the first audio terminal and the audio interface stage, and a second channel, channeling audio signals between the second audio terminal and the audio interface stage;
 wherein the audio controller automatically switches between the first channel and the second channel while giving priority to audio signals on the first channel over audio signals on the second channel.

Thereby respective software programs, among which one requires priority access to the audio component, running on one hardware apparatus, such as a personal computer, or on separate hardware apparatuses can be operatively connected to respective USB devices while sharing one audio component and while giving one of the respective software programs priority access to the audio component.

The audio component, which may be a headset such as a wired or wireless headset, is coupled to the audio interface unit. Each of the hardware apparatuses is configured with a USB host which enumerates USB devices in accordance with a Universal Serial Bus, USB, specification. The audio component may be an audio transducer such as a microphone or loudspeaker. The audio interface stage serves to interface with audio component via a wired or wireless connection.

The respective software programs may comprise e.g. a telephone program (sometimes denoted a softphone) and a music player. The telephone program may be given priority access to the audio component such that phone calls can be prioritized over listening to music or vice versa.

In case the respective software programs runs on one, common hardware apparatus such as a personal computer, multiple USB host ports thereof are connected (by respective cables) to respective multiple USB device ports of the peripheral device. The respective multiple USB device ports comprises the first USB device port, which is given priority, and the second USB device port. The software program requiring priority access to the audio component is configured to select the USB device associated with the first USB device port—thereby the software program that is given priority access is selected.

In case the respective software programs runs on multiple, separate hardware apparatuses such as a personal computer and a desk telephone, respective USB host ports thereof are connected (by respective cables) to respective multiple USB device ports of the peripheral device. In this way the peripheral device connects to multiple, separate hardware hosts.

The first route and the second route may be established via a direct memory access (DMA) method. The first audio function unit and the second audio function unit may output audio signals such as digital audio signals in a pulse code modulation (PCM) format.

The first USB device and the second USB device may be embodied on one or two respective silicon dies in integrated circuit packages (chips). In some aspects the audio controller is embodied in the audio function of one or both of the USB devices. In some aspects the audio controller is embodied as a digital signal processor on a silicon die separate from first USB device and the second USB device.

In some embodiments, the audio controller gives priority to audio signals on the first channel over audio signals on the second channel in response to presence of audio signals at respective buffers, respectively buffering audio signals to and/or from the first USB device or the second USB device.

Thereby, detection points for presence of audio signals are provided. The presence of audio signals may be indicated by interrupt signals raised by a process that monitors the buffers.

In some aspects the audio controller comprises a first audio buffer and a second audio buffer respectively buffering audio signals entering and/or leaving the first channel and the second channel. The buffers may be implemented in a digital signal processor or in an audio function of a USB device.

In some embodiments the first USB device and the second USB device comprise a respective audio signal buffer and the audio interface stage or the audio controller comprises at least one audio signal buffer for buffering signals received via the audio interface stage; wherein the buffers are monitored to detect presence of audio signals.

Thereby detections points at both ends of the first channel and the second channel are provided. Signals present on the first channel may be given priority not only when they arrive from the first USB host, but also when they arrive from the audio component, such as a headset.

In general, the audio signal buffers may be unidirectional ring buffers. The audio signal buffers may be configured as bidirectional buffers embodied as two unidirectional ring buffers.

In some embodiments presence of audio signals at a buffer is detected via a first detector that raises an interrupt the moment the audio buffer begins to receive audio signals or the moment a fill level of the buffer exceeds a predefined threshold.

In some aspects an interrupt is raised the moment presence of audio signals is detected. This may take place from a state of the buffer wherein the buffer is empty. The first detector may thus detect audio signals on the prioritized, first channel, and cause unconditional switching to the first channel despite of ongoing audio signal traffic on the second channel.

In some aspects a buffer is monitored to initiate a first interrupt at least when the audio buffer is about to run full or at least the moment a fill level of the buffer exceeds a predefined threshold. The threshold may be set at a fill level of e.g. 75% or 90% such that there is still some room for receiving audio signals for a limited period of time before removing of audio signals form the buffer commences.

In some embodiments presence of audio signals at an audio buffer is detected via a second detector that detects audio signal traffic through the audio buffer.

The second detector may detect audio signal traffic on the first channel and serve to prevent shifting away from the first channel i.e. to maintain that priority is locked to the first channel. Thus, a signal from the first detector on the second channel, indicative of presence of audio signals, may be conditioned on a signal from the second detector on the first channel being not indicative of presence of audio signals. The audio controller may implement the first and/or second detector.

In some embodiments the audio controller shifts from the second channel to the first channel in case the first detector raises an interrupt on the first channel, and shifts from the first channel to the second channel in case the first detector raises an interrupt on the second channel, but forgo shifting from the first channel to the second channel in case the second detector detects audio signal traffic through the audio buffer on the first channel.

In some embodiments the apparatus comprises: a third USB device for connecting operatively to a third USB host via a third USB device port; wherein the third USB device has a third audio function unit with a third audio terminal; wherein the audio controller additionally is configured with a third channel, channeling audio signals between the third audio terminal and the audio interface unit; and wherein the audio controller selects one of the first channel, the second channel and the third channel while giving priority to the first channel over the second channel and to the second channel over the third channel. Thereby, an array of prioritized physical USB device ports can be provided on the apparatus which may be connected correspondingly to thereby intuitively select a desired array of priorities.

In some embodiments the apparatus comprises: a telephone interface unit associated with a human interface protocol and configured with a fourth audio terminal; wherein the audio controller additionally is configured with a fourth channel, channeling audio signals between the fourth audio terminal and the audio interface unit; and wherein the audio controller is configured via a user interface to give the fourth audio channel a priority rank above or below one or more of the first audio channel, the second audio channel and the third audio channel if available.

Thereby an array of prioritized connections (comprising USB and non-USB ports) can be provided on the apparatus which may be connected to select a desired array of priorities, wherein USB and non-USB devices may be prioritized among each other. Thereby, e.g. Bluetooth headsets or Bluetooth phones or DECT headsets or DECT phones or the like may be included in the array of priorities.

In some embodiments the audio interface stage comprises a first audio interface unit and a second audio interface unit each unit configured to interface with an audio transducer; wherein the audio controller is configured to channel the audio signals to/from one or both of the first audio interface unit and the second audio interface unit.

Thereby different preferred audio components may be connected at the same time or a range of different interfaces may be provided so as to match an interface of a specific audio component that a user may prefer. Also, different preferred audio components may be connected at the same time and the audio controller is configured to channel the audio signals to/from one or both of the first audio interface unit and the second audio interface unit depending on the type of audio signals present. For instance, audio signals from a music player may be coupled to a first audio interface unit connected to a loudspeaker, whereas audio signals from a telephone may be coupled to a second audio interface unit connected to a headset.

In some aspects the audio controller is configured via a user interface to channel the audio signals to/from one or both of the first audio interface unit and the second audio interface unit. The user interface may be displayed on a USB host such as a personal computer or on the apparatus itself.

The first audio interface unit and the second audio interface unit may be selected from a group of interfaces that operate in accordance with one or more of: a DECT radio interface, a Bluetooth radio interface, an SPDIF, a TOSLINK or an analogue audio format.

In some embodiments the second audio interface unit is a USB host for audio-class sub-clients. The apparatus may serve as a host for one or more devices e.g. limited to serve devices in the audio class.

In some embodiments the apparatus comprises a first and a second label arranged and designed to give visual guidance on which one of the first USB device port and the second USB device port that is given priority over the other one. Such a label greatly helps users to locate the port at which to connect the USB cable from a given host to obtain the desired priority of that host. As examples the labels may comprise labels indicated: "1", "2" and "3" or "A" "B" "C".

In some embodiments the apparatus is a base station for wireless communication with a headset.

Here and in the following, the terms 'controller', 'processor', 'apparatus', 'device' and 'unit' are intended to comprise any circuit and/or device suitably adapted to perform the functions described herein. In particular, the above term comprises general purpose or proprietary programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

BRIEF DESCRIPTION OF THE FIGURES

A more detailed description follows below with reference to the drawing, in which.

DETAILED DESCRIPTION

Figure 1:
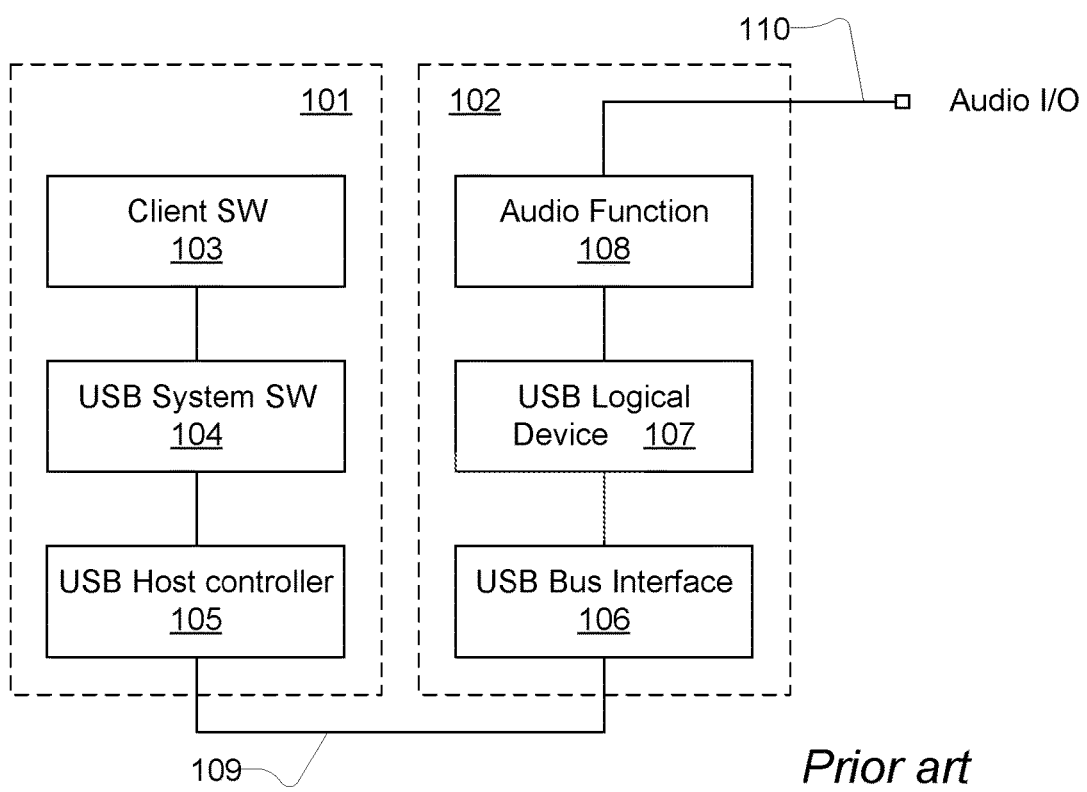
FIG. 1 shows a USB host apparatus with a conventional USB host and a conventional USB device.

FIG. 1 shows a USB host apparatus with a conventional USB host and a conventional USB device. Such a system is a conventional USB system.

The USB host apparatus 101, which may be a general purpose computer or a USB enabled desk telephone or another type of electronic device, comprises hardware and software to serve as a USB host. The USB host apparatus 101 is interconnected with a USB device 102 at respective USB ports (not shown) via a USB cable 109. The USB device 102 may be configured as an audio class device and may comprise a port 110 for providing input and/or output of physical audio signals. The USB device 102 may e.g. comprise electro-acoustical transducers such as a microphone and a loudspeaker (not shown). In some embodiments the USB device 102 is a base station for a headset or a USB enabled headset.

The USB host comprises a USB host controller 105, USB system software 104 and client software 103. The USB device 102 comprises a structure matching the USB host and comprises a USB bus interface 106, a USB logical device 107 and an audio function 108. This way of depicting a USB system is also used in the USB specification available at www.usb.org.

Generally, it should be noted that USB is a hierarchical system where a USB host sits at the top of the hierarchy and controls communication within the USB system and is responsible for configuring USB devices within the system. A USB device has some defined function e.g. an audio function 108 and communicates via the USB system with some client software running on the computer 101 and using the function at the device. Also, a USB device can be configured with multiple functions and is sometimes referred to as a compound device. Since a USB device attaches to the USB system via a respective and physical USB port, the USB specification allows USB hubs that can expand a USB port into multiple USB ports and thereby expand the hierarchy with more devices, where the USB host remains as the single USB host of the system. A USB hub mainly serves to relay data from an upstream port to multiple downstream ports and vice versa. Each device attached to the USB hub is configured and made individually addressable for the USB host.

Figure 2:
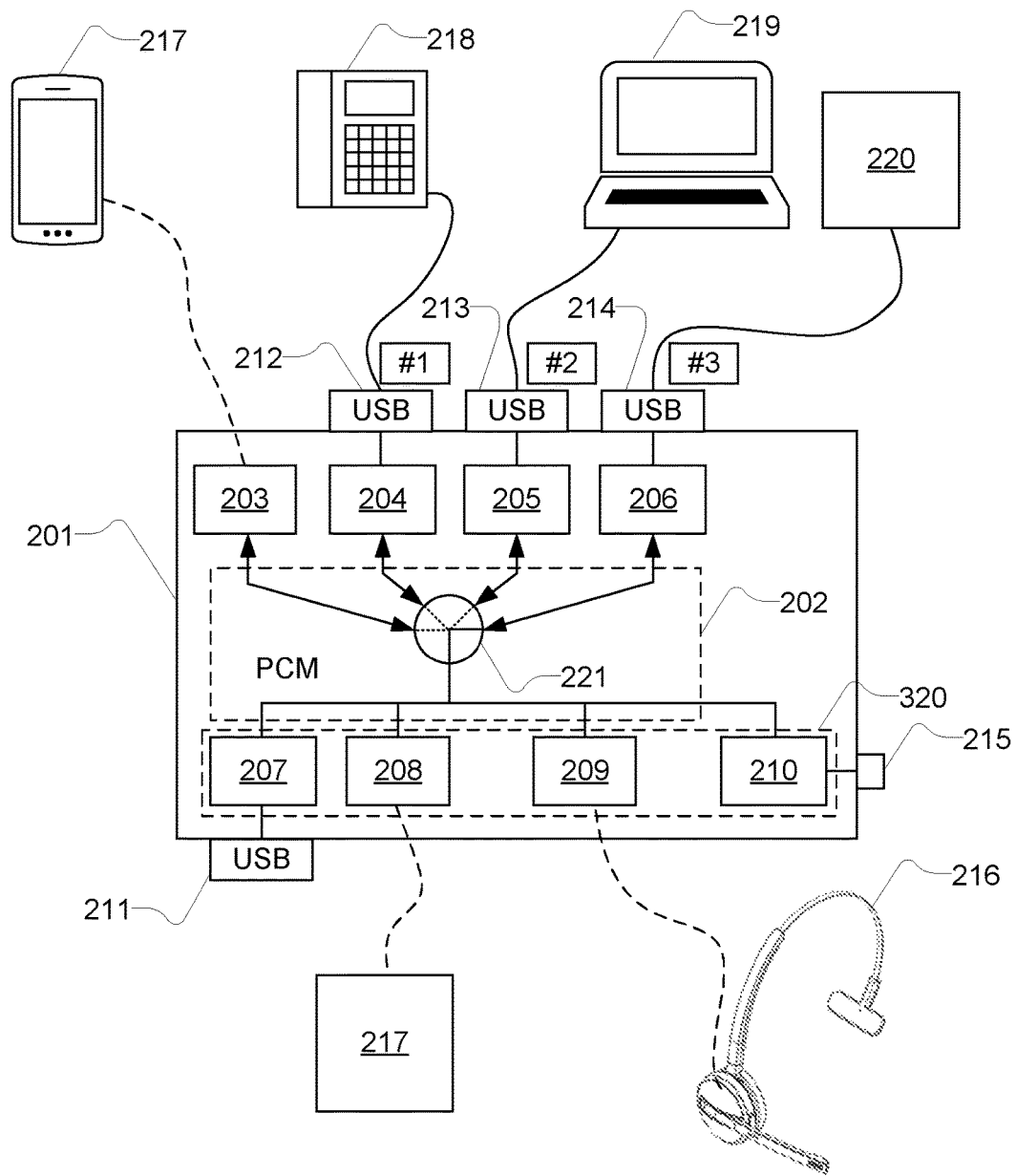
FIG. 2 shows a first block diagram of an apparatus with an integrated audio controller and integrated multiple USB audio devices connected to peripheral multiple USB hosts and peripheral multiple audio units.

FIG. 2 shows a first block diagram of an apparatus with an integrated audio controller and integrated multiple USB audio devices connected to peripheral multiple USB hosts and peripheral multiple audio units.

Thus, the apparatus 201 comprises multiple USB audio devices 204; 205 and 206 with a respective USB device port 212; 213; and 214. The USB device ports 212; 213; and 214 are connected via USB cables to a desk telephone 218, a computer 219 and another apparatus 220, all of which comprises a respective USB host.

To give clear guidance to a user connecting the USB cables to the USB device ports 212; 213; and 214, labels designated "#1", "#2", "#3" are placed in vicinity of the USB ports to indicate which USB device port (and thus which USB host) that is given which priority. "#1" may indicate a highest priority.

Each of the USB audio devices 204; 205 and 206 provides endpoints and/or audio function terminals on which audio signals, such as audio signals in a pulse code format (PCM), are supplied from or to a so-called USB pipe (confer a USB specification). The endpoints and/or audio function terminals provides an interface to an audio controller 202 wherein audio signals are processed in an audio signal domain, such as a pulse code modulation (PCM) domain.

The audio controller 202 comprises a priority switch 221 which is coupled to the endpoints and/or audio function terminals to interface with the USB devices 204; 205 and 206 and to an audio interface stage 320 configured interface units 208 and 209 to interface with respective audio components such as a headset 216 and a loudspeaker 217. The audio interface stage 320 may also comprise a USB host 207 providing a USB port for USB enabled audio devices such as a headset, a loudspeaker or a microphone e.g. a conference microphone and an analogue interface 210 providing a terminal 215 for communicating analogue audio signals.

The apparatus 201 may also comprise a radio unit 203 e.g. a Bluetooth compliant or a DECT compliant radio unit for communicating with a compatible device 217 e.g. a smart phone. The radio unit 203 is also coupled to the priority switch 221. The priority switch 221 is configured to switch the audio signals which may be pulse code modulation signals e.g. via a direct memory access method.

The operation of the priority switch is described in greater detail in connection with FIG. 4 and structure of the USB devices coupled to the audio controller is described in greater detail in connection with FIG. 3.

Figure 3:
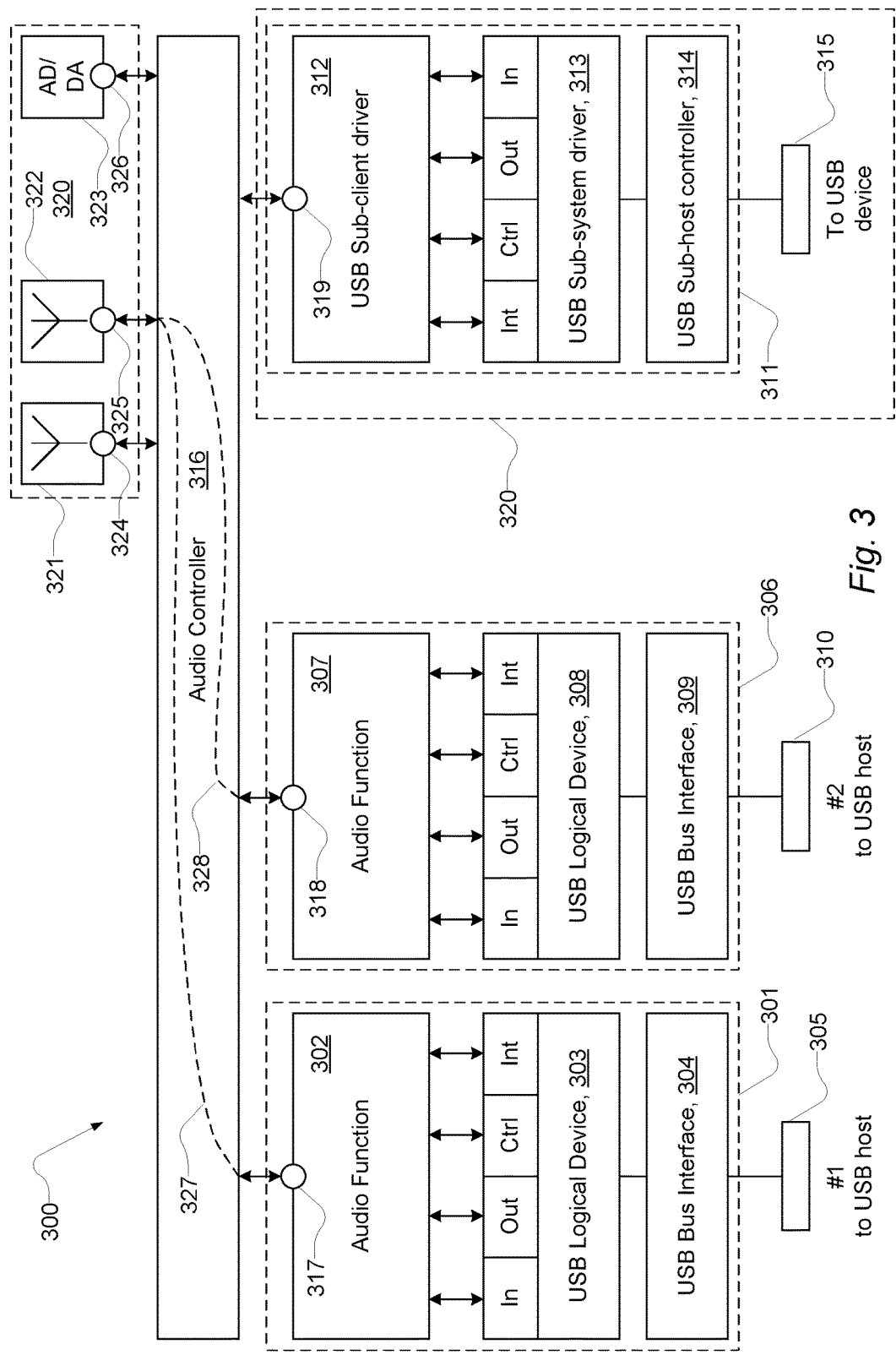
FIG. 3 shows a second block diagram of a portion of the apparatus apparatus with an integrated audio controller and integrated multiple USB audio devices.

FIG. 3 shows a second block diagram of a portion of the apparatus with an integrated audio controller and integrated multiple USB audio devices. In this block diagram, the apparatus is designated by reference numeral 300, the audio controller is designated 316, and the audio interface stage is designated 320. The audio controller 316 is coupled to a first USB device 301 with a first USB device port 305 and a second USB device 306 with a second USB device port 310. The audio controller 316 is also coupled to the audio interface stage 320.

As mentioned in connection with a conventional USB device, the first USB device 301 comprises a USB bus interface 304, a USB logical device 303 and an audio function 302. Similarly, the second USB device 306 comprises a USB bus interface 309, a USB logical device 308 and an audio function 307.

The first USB device 301 and the second USB device 306 are coupled to the audio controller 316 via respective audio function terminals 317 and 318. These audio function terminals may provide an interface to the audio controller 316 in case the audio controller 316 is embodied as a separate semiconductor die e.g. as a separate chip. Thus, for instance, the first USB device may be embodied as a first semiconductor die, the second USB device may be integrated with the first semiconductor die or embodied as a second semiconductor die and the audio controller is embodied as a third semiconductor die. Audio signals may then be communicated as pulse code modulated (PCM) signals between the semiconductor dies e.g. as a signal in accordance with the I2S specification.

In some embodiments the audio controller 316 is embodied in the audio function of one or more of the audio functions of the USB devices and is thereby hosted on one or more of the respective semiconductors.

The audio controller 316 is also coupled to the audio interface stage 320, which comprises audio interface units in the form of a first radio unit 321, a second radio unit 322, a USB host device 311 and an analogue interface 323 with one or more of an analogue-to-digital, a digital-to-analogue converter and an amplifier. The audio interface units are coupled via respective audio terminals 324, 325, 326 and 319 to the audio controller 316. Audio signals may then be communicated as pulse code modulated (PCM) signals between the audio interface units and the audio controller e.g. as a signal in accordance with the I2S specification. The USB host device 311 comprises a USB sub-host controller 314, a USB sub-system driver 313 and a USB sub-client driver 312 for communicating with an external USB device via USB port 315.

The audio controller 316 is configured with a first channel 327, channeling audio signals between the audio terminal 317 of the first USB device and an interface unit (in this case radio unit 322) of the audio interface stage 320. The audio controller 316 is also configured with a second channel 328, channeling audio signals between the audio terminal 318 of the second USB device and an interface unit (in this case radio unit 322) of the audio interface stage 320. The audio controller 316 automatically switches between the first channel 327 and the second channel 328 while giving priority to audio signals on the first channel over audio signals on the second channel. The channels are e.g. embodied via a direct memory access method. The channels may therefore be established in software and may be set up to channel audio data at different, non-overlapping periods in time.

Conventionally, a USB logical device and a USB host communicates data via endpoints. Endpoints terminate so-called pipes at respective ends of a pipe. There are defined various types of endpoints of which the endpoints in some embodiments comprise endpoints of the type designated 'IN' and/or 'OUT' and/or 'CONTROL' abbreviated 'Ctrl' and/or 'INTERRUPT' abbreviated 'Int'. The endpoints designated 'IN' and 'OUT' is configured for respectively inputting and outputting data to be transported over a USB pipe. In this embodiment audio data may be communicated in a pulse coded modulation, PCM, format. The endpoints 'CONTROL' and 'INTERRUPT' are inter alia for respectively communicating configuration values during a configuration process and for interrupting the USB host to fetch more recent data e.g. to read state values changed during a man-machine-interaction via a user interface (not shown).

Figure 4:
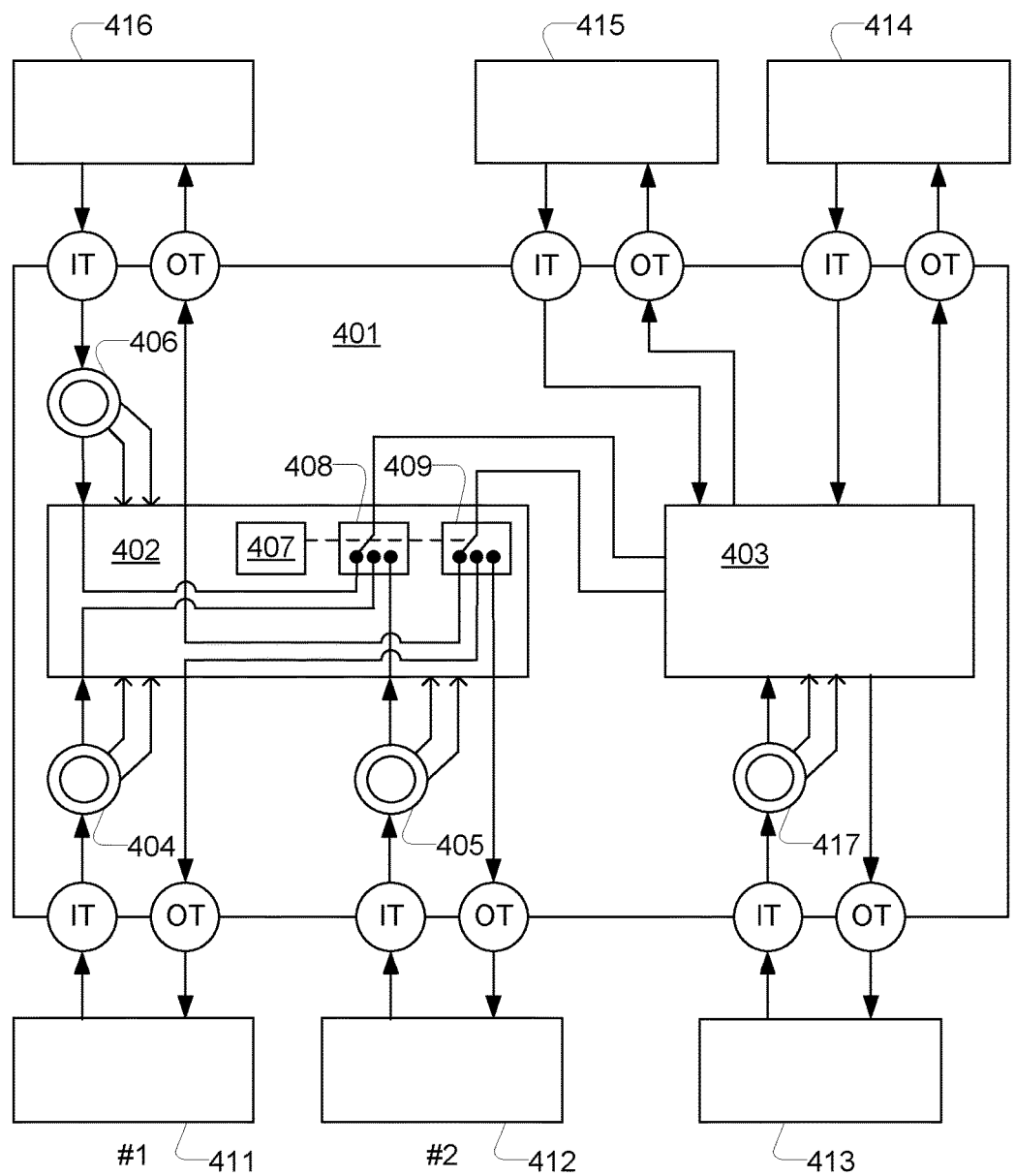
FIG. 4 shows a block diagram of an audio controller.

FIG. 4 shows a block diagram of an audio controller. The audio controller is here designated by reference numeral 401 and the priority switch is embodied as a first switch 402 coupled to an optional second switch 403.

The audio controller 401 interfaces with a first USB device 411 via an input audio terminal 'IT' and an output audio terminal 'OT', with a second USB device 412 via a similar input audio terminal 'IT' and an output audio terminal 'OT' and with a third USB device 416 via a similar terminals 'IT' and 'OT'.

The audio controller 401 also interfaces with audio interface units 413, 414 and 415 via respective audio terminals designated 'IT' and 'OT'.

The priority switch, embodied as a first switch 402 coupled to an optional second switch 403, establishes channels for channeling audio signals from one of the USB devices to one or more of the audio interface units 413, 414 and 415—and/or from one or more of the audio interface units 413, 414 and 415 to one of the USB devices in a mono-directional or bi-directional way.

The first switch 402 is coupled to the USB devices via audio signal buffers 404, 405 and 406. For the sake of completeness it should be noted that buffers are shown in connection with the input terminals 'IT', but that audio signal buffers may be provided also in connection with the output terminals 'OT' so as to provide bi-directionality with buffers in both directions.

It can be seen that the buffers 404, 405 and 406 have three outputs; a first output is indicated by a solid arrowhead and represents buffered audio signals; a second output is indicated by an open arrowhead and represents a first detector that raises an interrupt the moment the audio buffer begins to receive audio signals or the moment a fill level of the buffer exceeds a predefined threshold; and a third output, also indicated by an open arrowhead, represents a second detector that detects audio signal traffic (ongoing audio signal communication) through the audio buffer. Thereby the audio controller and the priority switch have sufficient input for controlling to which terminals priority should be given.

It should be noted that the audio interface units 413, 414 and 415 may have buffers with outputs providing similar information in connection with the audio input terminals 'IT'. For the sake of simplicity only one audio signal buffer 417 is shown in connection with the audio interface units 413, 414 and 415.

The first switch 402 comprises a first unidirectional switch 408 and a second unidirectional switch 409 to establish a bi-directional switch which is controlled by a switch controller 407. The switch controller 407 controls the bi-directional switch in response to signals provided by the first detector and the second detector from the USB devices and/or the audio interface units to implement a priority scheme to give priority to audio signals from the first USB device 411 over audio signals from second USB device 412 and to give priority to audio signals from the second USB device 412 over audio signals from third USB device 416.

The first switch 402 is coupled to one or more audio interface units optionally via a second switch 403. The second switch may select one or more audio interface units depending on one or more of predefined settings given via a user interface and a determination of which type of audio signals that are about to or are being channeled through the audio controller. For instance audio signals may be determined to be related to a call (a phone call) or to another type of audio (e.g. music). Thus, it is possible to select an audio interface unit coupled to a headset when the audio signals relate to a call and to select an audio interface unit coupled to a loudspeaker when the audio signals do not relate to a call. It is also possible to communicate with the audio units in parallel. Preferences like that may be given via a user interface as known in the art.

The invention claimed is:

1. A headset input prioritization system for management of competing audio signals from input devices, the system having a base station for a headset and a plurality of input devices comprising:
   a first USB device for connecting operatively to a first input host via a first input device port; wherein the first input device has a first audio function unit with a first audio terminal capable of conducting a first audio signal;
   an audio interface stage configured to interface with an audio component;
   a second input device for connecting operatively to a second input host via a second input device port; wherein the second input device has a second audio function unit with a second audio terminal capable of conducting a second audio signal; and
   an audio controller configured with: a first buffered channel configured to be connected to said first port, channeling audio signals between the first audio terminal and the audio interface stage, and a second channel configured to be connected to said second port, channeling audio signals between the second audio terminal and the audio interface stage; said buffered channel having input and output ends;
   a detector for detecting the presence of audio signals in said first buffered channel at input and output ends, and said first input device port;
      wherein the audio controller automatically switches between the first port and the second port or maintains connection to said first port if an audio signal is detected in the first input device port, while the audio signal in said second channel will be prevented from connecting to said audio interface stage and then onto said headset, so long as the first audio signal is still present at said first port by detection of data in said first buffer, thereby giving priority to audio signals on the first channel over audio signals on the second channel.

2. An apparatus according to claim 1, wherein said second channel is buffered.

3. An apparatus according to claim 1, wherein the first input device and the second input device comprise a respective audio signal buffer and the audio interface stage or the audio controller comprises at least one audio signal buffer for buffering signals received via the audio interface stage; wherein the buffers are monitored to detect presence of audio signals.

4. An apparatus according to claim 1, wherein presence of audio signals at a buffer is detected via a first detector that raises an interrupt the moment the audio buffer begins to receive audio signals or the moment a fill level of the buffer exceeds a predefined threshold.

5. An apparatus according to claim 1, wherein presence of audio signals at an audio buffer is detected via a second detector that detects audio signal traffic through the audio buffer.

6. An apparatus according to claim 5, wherein the audio controller shifts from the second channel to the first channel in case the first detector raises an interrupt on the first channel, shifts from the first channel to the second channel in case the first detector raises an interrupt on the second channel, but forgo shifting from the first channel to the second channel in case the second detector detects audio signal traffic through the audio buffer on the first channel.

7. An apparatus according to claim 1, comprising:
   a third USB device for connecting operatively to a third input host via a third input device port; wherein the third USB device has a third audio function unit with a third audio terminal;
   wherein the audio controller additionally is configured with a third channel, channeling audio signals between the third audio terminal and the audio interface unit; and
   wherein the audio controller selects one of the first channel, the second channel and the third channel while giving priority to the first channel over the second channel and to the second channel over the third channel.

8. An apparatus according to claim 1, comprising:
   a telephone interface unit associated with a human interface protocol and configured with a fourth audio terminal;
   wherein the audio controller additionally is configured with a fourth channel, channeling audio signals between the fourth audio terminal and the audio interface unit; and
   wherein the audio controller is configured via a user interface to give the fourth audio channel a priority rank above or below one or more of the first audio channel, the second audio channel and the third audio channel if available.

9. An apparatus according to claim 1, wherein the audio interface stage comprises a first audio interface unit and a second audio interface unit each unit configured to interface with an audio transducer;
   wherein the audio controller is configured to channel the audio signals to/from one or both of the first audio interface unit and the second audio interface unit.

10. An apparatus according to claim 9, wherein the second audio interface unit is a USB host for audio-class subclients.

11. An apparatus according to claim 1 wherein the apparatus is a base station for wireless communication with a headset.

12. An apparatus according to claim 1, wherein the apparatus comprises one or more of: a dock for a headset, a sound generator, electrical light sign, a wireless communications unit for wireless communication with the headset, a charger for delivering power for charging a battery in the headset, and a user interface unit for controlling a call via the apparatus, which is configured as a base station for the headset.

13. The apparatus of claim 1 wherein at least one of said input devices is at least in accordance with the Universal Serial Bus, USB, specification.

14. A method, at a base station for a headset for prioritizing a first device port over other device ports between a headset and base station, comprising:
   at a first device, comprised by the base station, connecting operatively to a first USB host via a first device port; wherein the device has a first audio function unit with a first audio terminal;
   at a second device, comprised by the base station, connecting operatively to a second host via a second device port; wherein the second device has a second audio function unit with a second audio terminal;

via an audio interface stage, comprised by the base station, interfacing with an audio component;

at an audio controller, establishing a first buffered channel the channel having an input and output of the buffer, channeling audio signals between the first audio terminal via said first device port and the audio interface stage, and a second channel, channeling audio signals between the second audio terminal and the audio interface stage; and at the audio controller detecting the presence of data in the first channel audio channel from the first port and automatically switching to the first channel, when the first channel has buffered data and maintaining a connection to that channel until there is no more data flow into that channel by detecting data in the input and output of the buffer before allowing the controller to connect to another channel.

15. A computer readable computer program product configured with instructions for a computer to perform the method according to claim 14 when the instructions are executed by the computer.

\* \* \* \* \*